UNITED STATES PATENT OFFICE.

HAROLD CHARLES ENGELSON AND ROBERT ARCHMENT, OF VICTORIA, BRITISH COLUMBIA, CANADA.

FIREPROOF PAINT.

1,087,111.

Specification of Letters Patent. Patented Feb. 17, 1914.

No Drawing. Application filed October 3, 1912. Serial No. 723,773.

*To all whom it may concern:*

Be it known that we, HAROLD C. ENGELSON and ROBERT ARCHMENT, citizens of the Dominion of Canada, residing at Victoria, in the Province of British Columbia, Canada, have invented a new and useful Fireproof Paint, of which the following is a specification.

This invention relates to a fireproof paint and comprises the particular selection of ingredients and the manner of their admixture to produce a cheap paint having the desired fire-proof properties and that will maintain its fluidity without settlement and have satisfactory spreading and covering qualities.

The ingredients which compose the paint and the general proportions used are as follows:

| | |
|---|---|
| Gas tar | 160 pounds. |
| Water | 140 pounds. |
| Common salt | 5 pounds. |
| Potash lye (potassium hydroxid) | 1½ pounds. |
| Lamp black | 1 pound. |
| Coal oil | 14 pounds. |

These ingredients are mixed to form the paint in the following manner: To the one hundred and sixty pounds of gas tar, which constitutes the "body" of the paint, is added the five pounds of common salt and the pound and a half of lye with about forty pounds of the water, or sufficient to form a saturated solution of the salt and lye. This mixture is well stirred. The salt and lye confer the fire-proof properties and effectively "cut" the tar enabling the salt and lye to be thoroughly mixed with it. The pound of lamp black and the remaining hundred pounds of water are then added to the compound, and the whole is well mixed together. This reduces the compound to the required fluidity and the lamp black confers opacity and blackness to the attenuated tar. To maintain the intimately mixed particles in a permanent condition of suspension in the water and to enable the paint to spread better, about fourteen pounds of coal oil are then added, and the mixture is thereafter well stirred twice with a half hour interval between the stirrings. The paint is now ready for use and, while spreading freely, is thoroughly fire-proof and not only so but confers fire-proof and preservative properties on the wood to which it is applied.

We are aware that coal tar has been frequently used in the composition of paint and that paint has been used having common salt as an ingredient to confer fire-proof properties, but believe that the composition herein set forth and mixed in the manner described is novel, as each ingredient performs a distinct service in the attainment of the desired result.

As described the amount of water is necessary to reduce the coal tar to the required degrees of fluidity, but the salt will not embody itself with the tar without the addition of the lye, which "cuts" the tar into finely divided particles. With the tar so attenuated with the water, the lamp black is necessary to impart the required blackness and covering qualities, and the whole ingredients so mixed will not retain their finely divided condition but will gradually settle together, unless the coal oil is added and is thoroughly mixed with the compound when it is in that finely divided state.

Having now particularly described our invention and the manner of its preparation, we hereby declare that what we claim as new and desire to be protected in by Letters Patent, is:

1. A fireproof paint which consists of the following ingredients in substantially the proportions stated, to wit:—

| | |
|---|---|
| Gas tar | 160 pounds. |
| Water | 140 pounds. |
| Common salt | 5 pounds. |
| Potash lye (potassium hydroxid) | 1½ pounds. |
| Lamp black | 1 pound. |
| Coal oil | 14 pounds. |

2. The process of preparing fireproof paints which consists in forming an intimate mixture of gas tar with a saturated solution of common salt and potassium hydroxid, then adding lamp black to the aforesaid admixture and subsequently reducing the same to the desired fluidity with water, mixing the mass so formed and then adding coal oil to the mass while repeatedly stirring the same.

3. A fireproof paint, including gas tar and water in approximately equal parts, associated with a sufficient quantity of a strong alkali to enable the water to "cut" the tar that the tar may be held in suspension.

4. A fireproof paint, including the following ingredients in substantially the proportions stated, to wit:—

| | |
|---|---|
| Gas tar | 160 pounds. |
| Water | 140 pounds. |
| Common salt | 5 pounds. |
| Potassium hydroxid | 1½ pounds. |

In testimony whereof we have signed our names to this specification in the presence of two subscribing witnesses.

HAROLD CHARLES ENGELSON.
ROBERT ARCHMENT.

Witnesses:
W. A. SMITH,
W. WARBURTON.

Copies of this patent may be obtained for five cents each, by addressing the "Commissioner of Patents, Washington, D. C."